Figure 1:
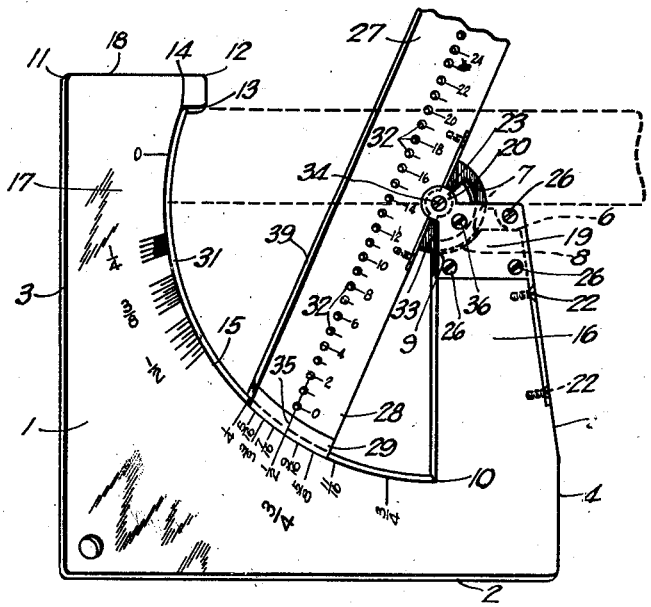

July 14, 1931.  W. W. FORD  1,814,441

DRAFTING INSTRUMENT

Filed Oct. 19, 1929

William Walter Ford INVENTOR
BY Loyal J. Miller
ATTORNEY

Patented July 14, 1931

1,814,441

UNITED STATES PATENT OFFICE

WILLIAM WALTER FORD, OF OKLAHOMA CITY, OKLAHOMA

DRAFTING INSTRUMENT

Application filed October 19, 1929. Serial No. 400,970.

My invention relates to a draftsman's scale for laying out, in elevation, definite courses in brick structure, and also for laying out roofs of various degrees of pitch. The objects of my invention are to provide a device of this class which is new, novel, practical and of utility; which when used by architectural darftsmen and engineers will provide a fast and accurate means for laying out in drawings the definite number and location of courses of brick in a proposed structure; which will be adapted for use upon plans drawn to various scales per inch or per fractional inch; which will be adapted by its various scales to indicate such brick courses when laid in mortar of various specified or desired thickness; which will further provide upon one of its faces, graduated scales and a movable arm which will accurately indicate both in degrees or in inches rise per foot of runs the slope of a roof; which will also indicate the pitch of a roof, an instrument which will be simple in construction and in use, which will be relatively inexpensive in manufacture; which will save much time; which will be durable; which will be efficient in accomplishing all the purposes for which it is intended.

The present method of laying out in elevation the courses of brick forming the walls of a proposed structure, is by use of a finely graduated rule or scale which is laid upon the drawing. In accordance with previously estimated data in which the thickness of the mortar to be used and the relation of the plan per inch to the foot of structure, is known, the drawing is tediously laid off by this scale. In so far as this applicant knows there is now no instrument available which may be set in accordance with available data as to thickness of mortar and as to the scale of the drawing, which when so set will positively indicate, without chance of error the position and number of such courses. This, my instrument, will do.

In so far as applicant knows or can ascertain there is now no single instrument available for ascertaining or laying off the varying pitches of roofs or of other angles couched in terms such as quarter pitch, half pitch, five-eighths pitch or the like, nor as specified in inches rise per foot of run. Present methods of laying off these pitches or slopes are slow and laborious. The information desired is instantly available by means of my instrument.

Figure 2:
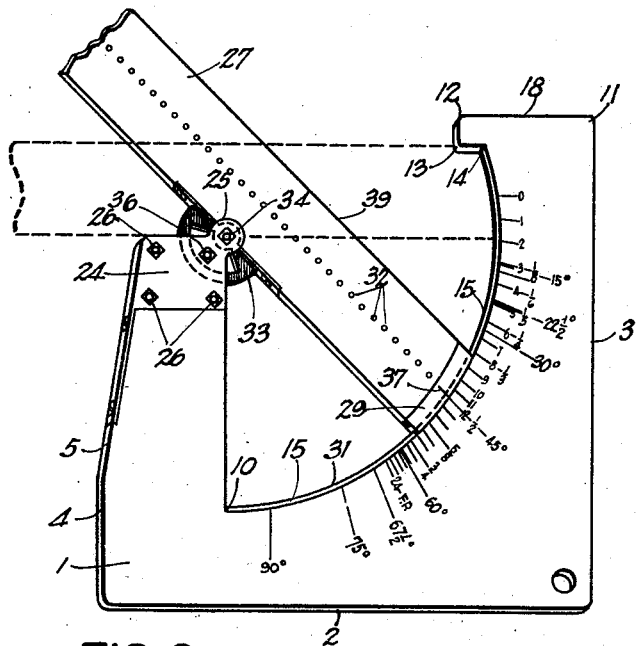
Figure 3:
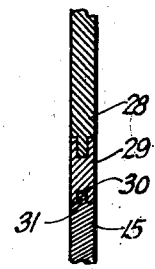

With these and other objects in view as will more fully appear, my invention consists in the construction, novel features, and combination of parts hereinafter more fully described, pointed out in the claims hereto appended, and illustrated in the accompanying one-sheet drawings, of which, Figure 1 is a perspective view, one face of the device showing the brick scale, a portion of the movable arm broken away;

Figure 2 is a perspective view of the reverse side of the device showing the pitch scale, the movable arm partly broken away; and Figure 3 is a fragmentary sectional view of the lower end of the movable arm and a portion of the segment of the device upon which the arm slides.

Like characters of reference designate like parts in all the figures.

It is understood that various changes in the form, proportion, size, shape, weight and other details of construction, within the scope of my invention may be resorted to without departing from the spirit or broad principle of my invention and without sacrificing any of the advantages thereof; and it is also understood that the drawings are to be interpreted as being illustrative and not restrictive.

One practical embodiment of the invention as illustrated in the drawings comprises:

A flat body member 1 of suitable opaque material is provided with a straight edged base 2 and at right angles thereto with a straight edged side 3. Opposite side 3 the lower outer edge 4 of said member 1 parallels said side 3 at right angles to base 2, thence slightly angles as shown at 5 toward side 3. The top edge of this portion 16 of the said body member from a point shown at 6 to a point shown as 7 lies parallel to said base 2, and thence is convexly curved as shown at 8 to a point shown as 9. From 9 the inner edge of said portion 16 parallels side 3 and extends toward said base 2 to a point shown as 10.

From the uppermost point 11 of the said edge 3, the top of this portion 17 of said member 1 forms a straight line 18 paralleling base 2, to a point shown as 12, thence at right angles downward to point 13 thence back toward said edge 3 to a point shown as 14. From point 14 to point 10 said member 1 is cut away to form a sector 15 of circle, the center of which circle is located at 34.

The upper front section of said portion 16 is provided with a metal plate 19 conforming to the contour of said portion 16, and having at its upper left hand corner an extending rounded portion 20. A downstanding extension 21 from portion 19 is set flush into the outer side edge of said portion 16 and there held by a plurality of usual screws 22 therethrough. Upon the reverse side of said portion 16 is a plate 24 companion to said plate 19. Plate 24 has also a rounded projecting portion 25, companion to said portion 20. Said plates 19 and 24 are held to said portion 16 by a plurality of small threaded bolt means 26.

A rectangular movable scale arm 27 of transparent material is provided, having upon its lower end portion 28 an opaque fitting 29. The end of said fitting 29 conforms to the contour of said sector 15, and its rounded edge is grooved as shown at 30 to slidably operate upon the tongue 31 which extends from said sector 15. Said arm 27 is provided with a plurality of spaced and longitudinally alined small perforations 32, which may be given indicia as desired, beginning at the lower most perforation shown in Figure 1 as zero. Said arm 27 is attached at a side edge portion by a usual rule joint 33 to the extended and rounded said portions 20 and 25 in such a manner that the axis 34 of such joint coincides with the axis of the circle of which 15 is a sector. Said arm 27 may then be rotated upon said axis 34, its sweep covering the quarter part of a circle. Alined with the centers of said perforations 32, a mark 35 extends from said zero perforation to the extreme outer edge of said fitting 29.

Said member 1 is provided upon its face, about and next adjacent the edge of said sector 15 with a plurality of graduated scales, respectively, indicated as ¼, ⅜, ½, and ¾ in Fig 1. Movement of the said arm 27 permits the said line 35 thereon to be alined with any desired line of the said graduated scales. A usual tension screw 36 permits the holding of said arm 27 in any of its desired positions.

The reverse face of said member 1 is provided with a scale as shown in Figure 2, said scale graduated from zero to the numeral 90, and those graduations which are of most frequent use are appropriately marked with designating indicia. The inner most line of graduations indicate the number of inches rise per horizontal foot, the outer most graduations of the scale indicate angles in degrees of a circle and are so marked, the intermediate markings of the graduations are to be read as is common to the art as ⅛ pitch, ¼ pitch, ½ pitch and the like. The mark 37 on this side of the arm 27 corresponds in position and in use with said mark 35.

The operation of the instrument for laying out courses of brick is as follows: In Figure 1, upon the face of the instrument will be noted the large fractional numerals ¼, ⅜, ½ and ¾. Opposite each of these numerals and adjacent the edge of the sector 15, will be found a plurality of graduations. The large fractional numeral ¼ indicates that the graduations opposite thereto are to be used with a drawing the scale of which is ¼ inch per foot. Likewise the other similar large fractional numerals each indicate the scale of the drawing. The smaller fractional numerals, as shown opposite ¾ in Figure 1 indicate the thickness of the mortar which is to be used between the courses of standard brick. It is to be understood, that the various graduations of the scales opposite each of said large fractional numerals ¼, ⅜ and ½ will take the same fractional numerals respectively as are shown opposite the large ¾, and that these graduations are not so numbered only because of lack of space.

Thus with the indicating line 35 of scale arm 27 alined as is shown in Fig. 1 with the small fractional numeral ½ of the scale indicated as ¾ the instrument is set for pointing off the brick courses upon a drawing the scale of which is ¾ inch to the foot of structure, said courses being laid in ½ inch mortar. Should it be desired to make the drawing to same scale, and to have the brick courses laid in ⅜ inch mortar, the line 35 would be moved to the left to aline with the ⅜ graduation. Should the scale of the drawing be ½ inch per foot, the scale indicated by the large fractional numeral ½ would be used and the line 35 of scale arm 27 would be alined with the specific graduation indicating the desired thickness of mortar to be used. In like manner the other scales ⅜ and ¼ would be used.

Having alined line 35 with the desired graduation of the desired scale, the instrument with base 2 or side 3 alined as usual with the T-square and properly positioned upon the drawing a sharp pointed pencil will be inserted in each of the desired plurality of perforations 32 thereby pointing off the desired number of brick courses to be laid. Removal of the instrument from the board will then permit the penciling in of the desired courses in the usual manner.

The operation of the angle finding scale upon the reverse face of the instrument will be obvious to those familiar with the art. With the base 2 or side 3 of instrument contacting the T-square, line 37 of scale arm 27 alined with the graduation corresponding to the pitch or slope desired, the edge 39 of arm 27 presents a ruler for penciling in lines of the angle desired.

Obviously, the invention is susceptible of embodiment in forms other than that which is illustrated in the accompanying drawings and described herein, and applicable, for uses and purposes other than as detailed, and I therefore consider as my own all such modifications and adaptations and other uses of the form of the device herein described as fairly fall within the scope of my invention.

Having thus described my invention what is claimed and desired to be secured by Letters Patent, is:

1. A device, as described, embodying a flat, square base member having a portion of its top and one side adjacent one of its upper corners cut away toward its center in a manner forming a sector of a circle, a flat rectangular blade pivotally mounted upon said base member adjacent said upper corner, the lower end of said blade slidably contacting and conforming to the arc of the edge of said sector, the upper end portion extending beyond the top edge of said base member, said blade having a longitudinal dividing line with a plurality of spaced perforations thereon, said base member having graduations adjacent said sector for co-acting with said line for laying out brick courses with different thicknesses of mortar joints on drawings of different scales by marking through said perforations.

2. A device, as described, embodying a flat, opaque, square base member having a portion of its top and one side adjacent one of its upper corners cut away toward its center in a manner forming a sector of a circle, a flat rectangular blade pivotally mounted upon said base member adjacent said upper corner, the lower end of said blade slidably contacting and conforming to the arc of the edge of said sector, the upper end portion extending beyond the top edge of said base member, said blade having a longitudinally central dividing line with a plurality of numerically designated spaced perforations thereon, said base member having graduations adjacent said sector for coacting with said line for laying out brick courses with different thicknesses of mortar joints on drawings of different scales by marking through said perforations.

3. A device, as described, embodying a flat, opaque, square base member having a portion of its top and one side adjacent one of its upper corners cut away toward its center in a manner forming a sector of a circle, a flat rectangular blade pivotally mounted upon said base member adjacent said upper corner, the lower end of said blade slidably contacting and conforming to the arc of the edge of said sector, the upper end portion extending beyond the top edge of said base member, said blade having a longitudinally central dividing line with a plurality of numerically designated spaced perforations thereon, said base member having graduations adjacent said sector for co-acting with said line for laying out brick courses with different thicknesses of mortar joints on drawings of different scales by marking through said perforations, the opposite side of said base member having adjacent said sector a plurality of scales for co-acting with said blade for laying out roof pitches of various degree, various slope per foot in inches and various rises of roofs in fractions of span lengths.

4. A device, as described, having in combination, a flat, opaque, square base member having a portion of its top and one side adjacent one of its upper corners cut away toward its center in a manner forming a sector of a circle, a flat rectangular blade pivotally mounted upon said upper corner, the lower end of said blade slidably contacting and conforming to the arc of the edge of said sector, the upper end portion extending beyond the top edge of said base member, said blade having a longitudinally central dividing line with a plurality of numerically designated spaced perforations thereon, said base member having graduations adjacent said sector for co-acting with said line for laying out brick courses with different thicknesses of mortar joints on drawings of different scales by marking through said perforations, the opposite side of said base member having adjacent said sector a plurality of scales for co-acting with said blade for laying out roof pitches of various degree, various slope per foot in inches and various rises of roofs in fractions of span lengths.

5. The combination with a flat, opaque, square base member having a portion of its top and one side adjacent one of its upper corners cut away toward its center in a manner forming a sector of a circle, of a flat rectangular blade pivotally mounted upon said base member adjacent said upper corner, the lower end of said blade slidably contacting and conforming to the arc of the edge of said sector, the upper end portion extending beyond the top edge of said base member, said blade having a longitudinally central dividing line with a plurality of numerically designated spaced perforations thereon, said base member having graduations adjacent said sector for co-acting with said line for laying out brick courses with different thicknesses of mortar joints on drawings of different scales by marking through said perforations, the opposite side of said base member having adjacent said sector a plurality of scales for co-acting with said blade for laying out roof pitches of various degree, various slope per foot in inches and various rises of roofs in fractions of span lengths.

WILLIAM WALTER FORD.